Dec. 28, 1948.  W. F. ALLER  2,457,297

FLUID METER

Filed Nov. 10, 1944

INVENTOR
W. F. Aller
BY Edward J. Noe
ATTORNEY

Patented Dec. 28, 1948

2,457,297

UNITED STATES PATENT OFFICE 2,457,297

FLUID METER

Willis Fay Aller, Dayton, Ohio, assignor to The Sheffield Corporation, Dayton, Ohio, a corporation of Ohio Application November 10, 1944, Serial No. 562,779

1 Claim. (Cl. 73—209)

This invention relates to fluid metering devices of the character used, for example, in gauges for determining or comparing a size or dimension of a workpiece.

One object of the invention is the provision of a device of the character mentioned for measuring fluid flow, and including a tapered tube and a float for accurately gauging the rate of flow of fluid and so arranged as to prevent the indicator or float from sticking in a limiting position.

Another object is the provision of a device having a light weight float member generally cup shaped and operable in a tapered tube for determining the rate of flow of fluid, a metallic bumper being provided at the top of the tube for yieldingly engaging and centering the float when the latter is projected to the top of the tube Another object is the provision of a gauging device having a float operable in a tapered tube to indicate the rate of flow of fluid through a gauging orifice, means being provided to dissipate an electrical charge accumulated by the float and provide for stable movements of the float.

Other objects and advantages of the invention will be apparent from the following description, the appended claims, and the accompanying drawing, in which, Fig. 1 is a side elevation of a flow measuring device embodying the present invention, a portion of the device being shown in central vertical section;

Figure 1:
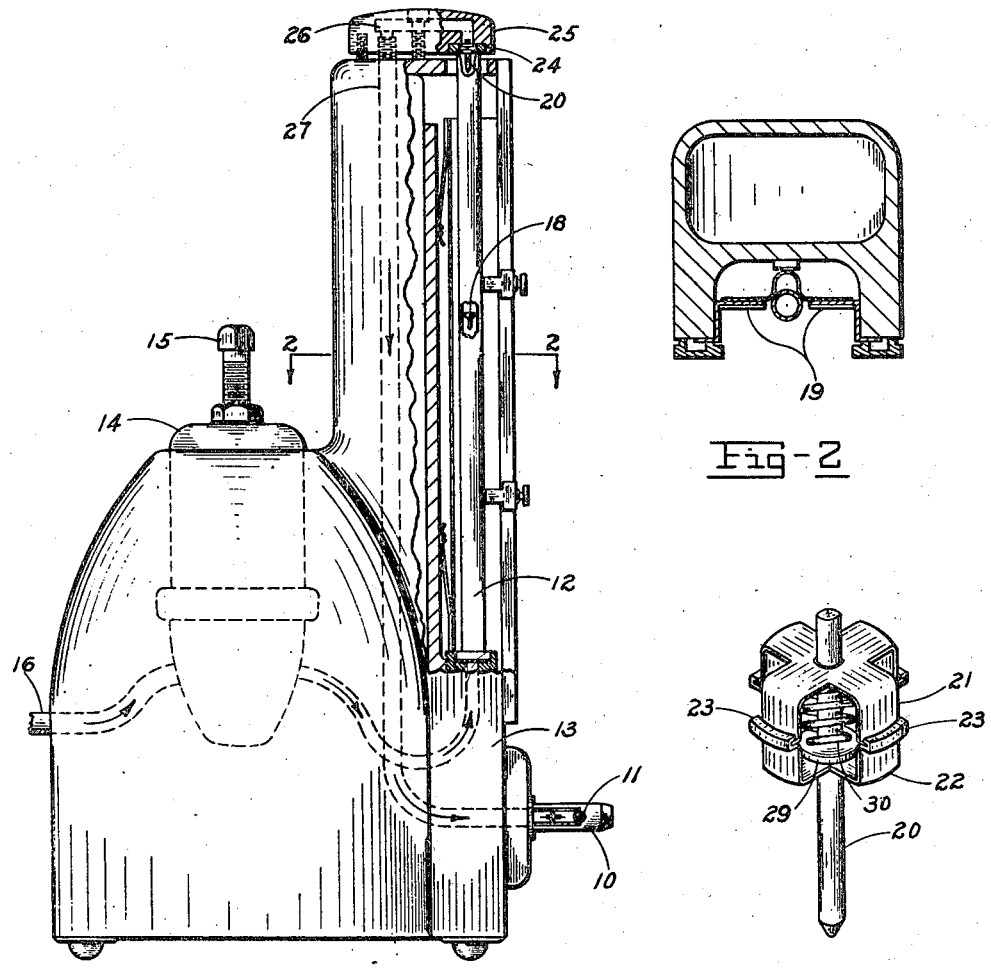
Figure 2:
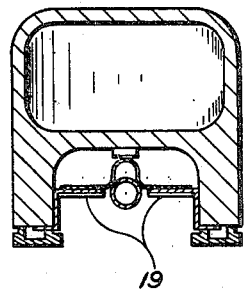
Fig. 2 is a sectional view on the line 2—2 of Fig. 1.
Figure 4:
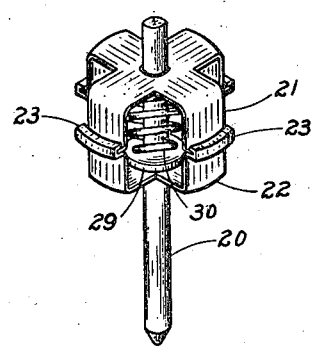
Fig. 4 is a perspective view of the bumper.

Referring more particularly to the drawing, in which the same reference numerals have been used to designate like parts in the several views, one form of the invention has been illustrated as embodied in a gauging device which employs fluid flow through a leakage path at a gauging orifice to determine a dimension of a workpiece. The gauging device comprises a gauging element 10 adapted for interfitting association with the workpiece surface to be gauged. While this gauging element may be either a male or a female part, as herein shown it is adapted to enter the workpiece to be gauged to obtain a diametrical measurement or comparison with a part of known dimensions. One or more leakage orifices 11 are provided in the gauging element so that a flow of air or other fluid can take place between the gauging orifice and the workpiece surface, and the size of the leakage path determines the rate of flow of fluid from a suitable pressure source. An instrument of this general character is illustrated in Patent No. 2,254,259.

Pressure fluid is supplied to the gauging orifice 11 through a hollow rigid transparent upright tube 12, carried by the support 13 on which the gauging element 10 is arranged. The lower end of this tube 12 is connected to a pressure regulating valve 14 having a suitable adjusting screw 15 which permits adjustment of the fluid pressure at its discharge side. Compressed air or other fluid is supplied to the pressure regulating valve by means of a pipe connection 16 adapted to be connected to the factory air line.

The tube 12 has an internal passage which very gradually tapers in cross-sectional area from a minimum diameter at its lower end to a maximum diameter at its upper end. Within the tube is a light indicator or float 18, the diameter of which is just slightly smaller than the diameter of the passage at the lower end of the tube 12. As air flows upwardly through the tube, it displaces the float 18 to some position above the bottom of the tube until the flow of fluid around the outside of the float takes place fast enough to permit the float to remain stationary on the moving body of fluid, its position above the bottom of the tube giving an indication of the rate of flow of fluid through the tube independently of the particular pressure prevailing at the supply end of the tube. The height of the float may be shown on a suitable scale provided on scale plates 19 arranged at the sides of the tube.

The construction just described is such that there is no substantial restriction to the flow of fluid from the pressure regulator valve to the tube 12 and to the gauging orifice so that with any given condition of supply pressure under the control of the regulating valve, the height to which the float 18 rises will be dependent upon the amount of leakage that takes place at the gauging orifice. By placing oversize and undersize masters on the gauging element and noting the positions of the float, the limiting positions of the float for pieces of acceptable size, will be given, and when the workpieces are applied, if the float rises up above the upper limiting position or fails to rise up to the lower limiting position, it will show that the parts should be rejected.

Figure 3:
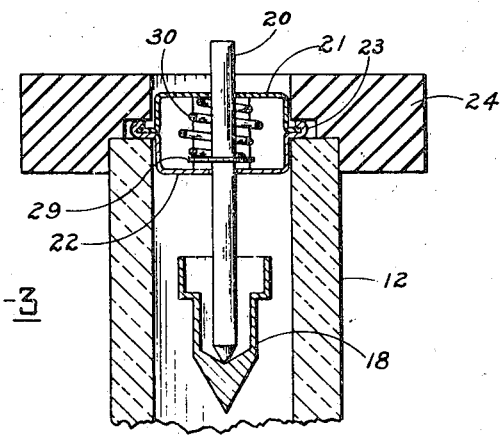
Fig. 3 is an enlarged transverse section through the upper end of the tapered tube and illustrating the float and the bumper.

The float 18 is very light in weight, and is preferably constructed of composition magnesium alloy. It is capable of receiving and carrying an electric charge which is imparted to it by the stream of air flowing through the tube. As shown in Fig. 3, the lower end of the float tapers downwardly to provide the bottom wall of the float, while the upper portion of the float is formed as a hollow wall reaching out to a suitable extent to permit the proper amount of air to flow between it and the tube 12. When the workpiece is removed from the gauging element 10, the gauging orifice is opened and there is a considerable flow of fluid which tends to blow the float up to the top of the tube rather forceably. Difficulty has been encountered in having the float descend, in devices that are not provided with the present invention, when the workpiece is applied to the gauging element and the flow through the tube is reduced to some small amount controlled by the size of the workpiece. There has also been difficulty in that on occasion a sluggish action of the float is produced by the clinging tendency of the float on the tube due to the presence of an electrical charge on the float. In accordance with the present invention, however, a metallic bumper is provided at the top of the tube for cushioning the impact of the float when the rate of flow of air is high. This bumper comprises a metallic stem 20 guided in a metallic shell formed of cups 21 and 22 which are connected together by the outwardly extending flanges 23 with which these parts are provided. These two cups form a skeleton cage, the flanged portions resting on the top of the tube 12 and being held down by a yielding pad 24 of rubber or rubber substitute. The pad 24 is arranged in a socket in the hollow cover 25. There is a passage 26 in the cover which connects the upper end of the tube 12 to the upper end of the pipe 27 through which the fluid is supplied to the gauging element 10.

The lower end of the stem 20 engages the upper side of the bottom wall of the float, at a point closer to the bottom end of the float than the upper end of the float. The lower end of the stem 20 is rounded and the upper side of the bottom wall of the float is formed as a rather flat cone so that the float will center itself on the lower end of the stem when it is forced up against the stem by a rapid flow of air.

Fixed on the stem 20 is a flange 29 adapted to engage the upper side of the cup 22 to limit downward movement of the stem, and a light spring 30 is provided between the flange 29 and the upper cup 21 to yieldingly urge the stem downwardly with a light pressure. When there is a rapid flow of air through the tube, and the float is projected rapidly towards the top of the tube, it strikes the stem and compresses the spring 30, which is light enough so that the air stream against the float will hold the stem elevated to some extent, holding the flange 29 some little distance above the cup 22, and this position will be maintained until the orifice 11 is partially covered or until the air supply to the pressure regulator is cut off. As soon as a part is applied to the gauging element, the flow of fluid is greatly reduced, and the float will be projected downwardly by the spring 30 acting through the flange 29 and through the stem, so that it will be impossible for the float to stick or cling in its uppermost position at the top of the tube, even though the presence of water or oil particles on the bumper or on the float may tend to make those parts adhere. It should be noted that the stem 20 is long enough to provide a substantial distance between the top of the float and the cup 22 even when the spring 30 is compressed, and this will permit free exit of air around the float and through the passages past the cups 21 and 22 which are cut away as illustrated in Fig. 1 for this purpose.

The metallic construction of the stem and the cups provide a body which although quite light in weight, has a large capacity to absorb or dissipate electrical charges, as compared with the capacity of the light weight float. These charges can then be carried off by the bulky rubber pad 24. During the time the float is operating in the tube it may absorb an electrical charge, but each time the float is projected up into engagement with the spring bumper, it dissipates its charge so that the float movements are stable and not affected by attraction or repulsion effects as between the float and the tube. And it should also be noted that the yielding action that takes place when the float strikes the bumper prevents the imposition of sudden large impacts or blows on the light delicate float each time the workpiece is removed from the gauging element so that the life of the float is tremendously increased.

While the form of device herein described constitutes a preferred embodiment of the invention, it is to be understood that the invention is not limited to this precise form and that changes may be made therein without departing from the scope of the invention which is defined in the appended claim.

What is claimed is:

A measuring device of the character described comprising an upright, transparent flow tube having a tapered passage with its lower end forming the supply portion and its upper end forming the discharge portion for the respective supply and discharge of a gaseous fluid, a support for said tube, a float in said tube responsive to the rate of flow of fluid through the tube, said float being cup shaped with a hollow upper portion and an imperforate lower wall the upper surface of such wall providing an upwardly and outwardly flaring central recess inside the float, a stem extending only partly down the tube and having its lower portion rounded and adapted to enter the hollow upper portion of the float in contact with the recess in the float's imperforate lower wall, and a spring carried at the upper end of said tube and yieldingly supporting said stem to gradually absorb the impact of the float.

WILLIS FAY ALLER.

REFERENCES CITED

The following references are of record in the file of this patent:

UNITED STATES PATENTS

| Number | Name | Date |
| --- | --- | --- |
| 828,108 | Graham | Aug. 7, 1906 |
| 2,130,981 | Fischer | Sept. 20, 1938 |
| 2,254,259 | Aller | Sept. 2, 1941 |
| 2,258,023 | McKernon | Oct. 7, 1941 |
| 2,311,375 | Farwick | Feb. 16, 1943 |

FOREIGN PATENTS

| Number | Country | Date |
| --- | --- | --- |
| 304,890 | Germany | Apr. 15, 1918 |
| 341,786 | Germany | Oct. 7, 1921 |